United States Patent
Nieh et al.

(10) Patent No.: US 7,739,625 B2
(45) Date of Patent: Jun. 15, 2010

(54) METHOD FOR CONTROLLING PEAK CURRENT OF A CIRCUIT HAVING A PLURALITY OF REGISTERS

(75) Inventors: Yow-Tyng Nieh, Hsinchu County (TW); Shih-Hsu Huang, Taichung (TW); Chia-Ming Chang, Kaohsiung County (TW)

(73) Assignees: Industrial Technology Research Institute, Hsinchu (TW); Chung Yuan Christian University, Chung-Li (TW)

( * ) Notice: Subject to any disclaimer, the term of this patent is extended or adjusted under 35 U.S.C. 154(b) by 500 days.

(21) Appl. No.: 11/616,289

(22) Filed: Dec. 27, 2006

(65) Prior Publication Data

US 2008/0127023 A1    May 29, 2008

(30) Foreign Application Priority Data

Sep. 19, 2006   (TW) .............................. 95134553 A

(51) Int. Cl.
    G06F 17/50    (2006.01)
(52) U.S. Cl. .............................................. 716/1; 716/5
(58) Field of Classification Search ..................... 716/1, 716/5, 12

See application file for complete search history.

(56) References Cited

U.S. PATENT DOCUMENTS

| 5,703,498 | A  | 12/1997 | Gould et al. |
| 6,559,701 | B1 | 5/2003  | Dillon |
| 6,795,954 | B2 | 9/2004  | Andreev et al. |
| 6,879,185 | B2 | 4/2005  | Swami et al. |

OTHER PUBLICATIONS

Article titled "Bus-Invert Coding for Low-Power I/O" jointly authored by Stan et al., IEEE Transactions on Very Large Scale Integration (VLSI) System, vol. 3, No. 1, Mar. 1995, pp. 49-58.
Article titled "State Re-Encoding for Peak Current Minimization" jointly authored by Huang et al., ICCAD'06, Nov. 5-9, 2006, San Jose, CA, pp. 33-38.

*Primary Examiner*—Sun J Lin
(74) *Attorney, Agent, or Firm*—Jianq Chyun IP Office

(57) ABSTRACT

A method for controlling a peak current is provided. The method first uses a plurality of registers to encode a plurality of states of a circuit and generates an original state code. Then, the original state code is re-encoded to reduce the difference between the sum of charging current of the charged registers and the sum of discharging current of the discharged registers while the registers are switched among the charging/discharging states. Finally, a standard technology library is read and logic circuit synthesis is performed for the re-encoded state codes.

15 Claims, 7 Drawing Sheets

| $S_0$ | $S_1$ | $S_2$ | $S_3$ | $S_4$ | $S_5$ | $S_6$ |
|---|---|---|---|---|---|---|
| 000 | 010 | 101 | 011 | 110 | 100 | 111 |

| State switching | Register | | | Charging/discharging activities |
|---|---|---|---|---|
| | $R_2$ | $R_1$ | $R_0$ | |
| $S_0 \to S_3$ | 0→0 | 0→1 | 0→1 | 2 charged |
| $S_0 \to S_6$ | 0→1 | 0→1 | 0→1 | 3 charged |
| $S_1 \to S_0$ | 0→0 | 1→0 | 0→0 | 1 discharged |
| $S_2 \to S_0$ | 1→0 | 0→0 | 1→0 | 2 discharged |
| $S_2 \to S_5$ | 1→1 | 0→0 | 1→0 | 1 discharged |
| $S_3 \to S_0$ | 0→0 | 1→0 | 1→0 | 2 discharged |
| $S_3 \to S_1$ | 0→0 | 1→1 | 1→0 | 1 discharged |
| $S_4 \to S_2$ | 1→1 | 1→0 | 0→1 | 1 charged, 1 discharged |
| $S_4 \to S_5$ | 1→1 | 1→0 | 0→0 | 1 discharged |
| $S_5 \to S_3$ | 1→0 | 0→1 | 0→1 | 2 charged, 1 discharged |
| $S_5 \to S_6$ | 1→1 | 0→1 | 0→1 | 2 charged |
| $S_6 \to S_4$ | 1→1 | 1→1 | 1→0 | 1 discharged |
| $S_6 \to S_5$ | 1→1 | 1→0 | 1→0 | 2 discharged |

FIG. 7

| State switching | Switching function $hi \to j(k)$ | | | Direction function $di \to j(k)$ | | |
|---|---|---|---|---|---|---|
| | $R_2$ | $R_1$ | $R_0$ | $R_2$ | $R_1$ | $R_0$ |
| $S_0 \to S_3$ | 0 | 1 | 1 | 0 | 1 | 1 |
| $S_0 \to S_6$ | 1 | 1 | 1 | 1 | 1 | 1 |
| $S_1 \to S_0$ | 0 | 1 | 0 | 0 | 0 | 0 |
| $S_2 \to S_0$ | 1 | 0 | 1 | 0 | 0 | 0 |
| $S_2 \to S_5$ | 0 | 0 | 1 | 0 | 0 | 0 |
| $S_3 \to S_0$ | 0 | 1 | 1 | 0 | 0 | 0 |
| $S_3 \to S_1$ | 0 | 0 | 1 | 0 | 0 | 0 |
| $S_4 \to S_2$ | 0 | 1 | 1 | 0 | 0 | 1 |
| $S_4 \to S_5$ | 0 | 1 | 0 | 0 | 0 | 0 |
| $S_5 \to S_3$ | 1 | 1 | 1 | 1 | 0 | 1 |
| $S_5 \to S_6$ | 0 | 1 | 1 | 0 | 1 | 1 |
| $S_6 \to S_4$ | 0 | 0 | 1 | 0 | 0 | 0 |
| $S_6 \to S_5$ | 0 | 1 | 1 | 0 | 0 | 0 |

FIG. 8

| $S_0$ | $S_1$ | $S_2$ | $S_3$ | $S_4$ | $S_5$ | $S_6$ |
|---|---|---|---|---|---|---|
| 001 | 011 | 100 | 010 | 111 | 101 | 110 |

FIG. 9

| State switching | Register | | | Charging/discharging activities |
|---|---|---|---|---|
| | $R_2$ | $R_1$ | $R_0$ | |
| $S_0 \rightarrow S_3$ | 0→0 | 0→1 | 1→0 | 1charged, 1discharged |
| $S_0 \rightarrow S_6$ | 0→1 | 0→1 | 1→0 | 2charged, 1discharged |
| $S_1 \rightarrow S_0$ | 0→0 | 1→0 | 1→1 | 1 discharged |
| $S_2 \rightarrow S_0$ | 1→0 | 0→0 | 0→1 | 1charged, 1discharged |
| $S_2 \rightarrow S_5$ | 1→1 | 0→0 | 0→1 | 1 charged |
| $S_3 \rightarrow S_0$ | 0→0 | 1→0 | 0→1 | 1charged, 1discharged |
| $S_3 \rightarrow S_1$ | 0→0 | 1→1 | 0→1 | 1 charged |
| $S_4 \rightarrow S_2$ | 1→1 | 1→0 | 1→0 | 2 discharged |
| $S_4 \rightarrow S_5$ | 1→1 | 1→0 | 1→1 | 1 discharged |
| $S_5 \rightarrow S_3$ | 1→0 | 0→1 | 1→0 | 1charged, 2discharged |
| $S_5 \rightarrow S_6$ | 1→1 | 0→1 | 1→0 | 1charged, 1discharged |
| $S_6 \rightarrow S_4$ | 1→1 | 1→1 | 0→1 | 1 charged |
| $S_6 \rightarrow S_5$ | 1→1 | 1→0 | 0→1 | 1charged, 1discharged |

FIG. 10

METHOD FOR CONTROLLING PEAK CURRENT OF A CIRCUIT HAVING A PLURALITY OF REGISTERS

CROSS-REFERENCE TO RELATED APPLICATION

This application claims the priority benefit of Taiwan application serial no. 95134553, filed Sep. 19, 2006. All disclosure of the Taiwan application is incorporated herein by reference.

BACKGROUND OF THE INVENTION

1. Field of the Invention

The present invention relates to a method for controlling a peak current, and more particularly to a method for controlling a peak current generated by a plurality of registers in a circuit.

2. Description of Related Art

In current Very Large Scale Integrated (VLSI) Circuits, in order to propagate a clock signal to each clock register nearly at the same time, the most common method is to connect the clock buffers in a series, and this structure is generally called a clock tree. As for the operation of the clock tree, the clock signal periodically charges and discharges the capacitor at each output terminal of the clock tree, which is significantly different from the common combinational logic that changes the voltage level of the output terminal only according to the logic function.

As for a sequential circuit, the peak current may be divided into three parts, namely, synchronous logic, clock tree and combinational logic. Through a further analysis, the synchronous logic and the clock tree parts are both triggered and driven by a clock signal. In the design of zero clock skew circuit, the clock signal reaches each register simultaneously, such that the current generated by all the registers accumulate at the same time, thus causing a huge peak current. Particularly, along with the progress of the manufacturing process technology, the design complexity is raised, and the number of the registers is increased accordingly, thus, the peak current effect becomes more obvious. Conventionally, the common method for reducing the peak current on the chip is to use a clock tree structure with non-zero clock skew. This structure uses reaching times of different clock signals to properly adjust the triggering time of the synchronous logic, such that the current consumption of individual synchronous logics are staggered, thus reducing the peak current. Or otherwise, a clock tree structure for selectively enabling clock signals may be used, which mainly disables one part of clock signals that do not operate temporarily in the sequential circuit, so as to reduce the unnecessary dynamic power consumption, thus reducing the power consumption of the whole chip.

SUMMARY OF THE INVENTION

The present invention is directed to a method for controlling a peak current, which adds a set of inverter pairs at an output terminal and an input terminal of a register, such that the charging/discharging current of the registers is allocated evenly, thus reducing the peak current generated by the registers in a circuit.

The present invention is also directed to a method for controlling a peak current, which re-encodes the state code of each state in a finite state machine circuit, such that the charging/discharging current of a plurality of registers in the circuit are allocated evenly, thus reducing the peak current generated by the plurality of registers in the circuit.

Based on the above and other objectives, the present invention provides a method for controlling a peak current, which is suitable for reducing the peak current generated by a plurality of registers in a circuit, and the method comprises the following steps. First, when a peak current occurs, charging/discharging states of all registers in the circuit are analyzed, and the registers are classified into a charged group and a discharged group according to the analysis result. Next, inverter pairs are added to input/output terminals of a part of the registers, so as to switch the charging/discharging states of the registers, thus reducing the difference between the sum of the charging current of the registers of the charged group and the sum of the discharging current of the registers of the discharged group.

In the method for controlling a peak current according to a preferred embodiment of the present invention, the circuit is a gate-level netlist.

In the method for controlling a peak current according to a preferred embodiment of the present invention, before the step of analyzing charging/discharging states of all the registers in the circuit, it further comprises performing a gate-level simulation for the circuit, so as to generate a switching activities file for the switching of charging/discharging states of the registers, and a standard technology library is read for performing a peak current analysis with the switching activities file.

According to another aspect of the present invention, a method for controlling a peak current suitable for controlling the peak current of a circuit comprising s states is provided, and the method comprises the following steps. First, m registers are used to perform binary encoding of m bits for each state of the circuit, so as to generate an original state code, wherein m is an integer greater than 0, and $2^m \geq s$. Next, the original state code is re-encoded, so as to generate a re-encoded state code, such that the difference between the sum of charging current of the charged registers and the sum of discharging current of the discharged registers is reduced while the registers are switched among the states. Finally, a standard technology library is read, so as to perform logic synthesis for the re-encoded state code.

According to a preferred embodiment of the present invention, the circuit is a finite state machine circuit.

According to a preferred embodiment of the present invention, the step of re-encoding the state codes comprises the following steps: calculating a switching function value according to whether or not the charging/discharging state of the register is changed while the register is switched among the states; calculating a direction function value according to whether or not the charging/discharging state of the register is changed and whether or not the charging/discharging state of the register is changed into the charging state while the register is switched among the states; individually setting inversion variables according to whether or not the charging/discharging state of the register is opposite before and after the register is re-encoded; directing to a plurality of paths switched among the states, multiplying the corresponding switching function values, direction function values and inversion variables, so as to respectively calculate the sum of charging current and the sum of discharging current of the registers with the same charging/discharging state at the same time, and letting the sums to be less than or equal to a limit value, thus obtaining a plurality of state inequalities, wherein the limit value is a variable; calculating a minimum value of the limit value for the state inequalities and the inversion variable value corresponding to each register by using an integer linear programming method, wherein the inversion variables satisfy the state inequalities; and re-encoding the original state code according to the inversion variable values, so as to generate a re-encoded state code.

In the present invention, the charging/discharging activities of all registers are analyzed when the peak current occurs, and a circuit structure with inverter pairs is used to compensate the peak current consumption caused by charging/discharging the registers, thus finally obtaining a new gate-level netlist with a low peak current. According to another aspect of the present invention, as for a finite state machine circuit, the state code of the lowest peak current is obtained by means of state re-encoding, inverter pairs are added according to the re-encoded state code, or the standard technology library is read, so as to perform the logic synthesis for the re-encoded state code, thereby obtaining the finite state machine circuit with a low peak current.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7 is an analysis view of charging/discharging activity of the register according to the original state code of FIG. 6.

FIG. 8 is an analysis table represented by switching function and direction function according to the state transition graph of FIG. 5.

FIG. 9 shows a re-encoded state code of the finite state machine circuit according to a preferred embodiment of the present invention.

FIG. 10 is an analysis view of charging/discharging activity of the register according to the re-encoded state code of FIG. 9.

DESCRIPTION OF EMBODIMENTS

In a sequential circuit, the register is used to memorize circuit states and transmit circuit processing results. Since a clock signal triggers all the registers at the same time, the peak current generated by the registers plays a crucial role in the peak current of the whole chip. Therefore, if the peak current of the registers is reduced effectively, the peak current of the whole chip is reduced accordingly.

As for the peak current of the register, the output load of the register is formed by input capacitances of a plurality logic gates and corresponding winding loads, thus, the external load must be much greater than the internal load. Therefore, it can be deduced that, the peak current of the register is mainly caused by charging and discharging effects of switching current. When an output signal of the register changes from 0 to 1, a current flows into the output terminal of the register from a power line $V_{DD}$, thus producing a charging effect. When the output signal of the register changes from 1 to 0, the current flows into a ground line $V_{SS}$ from the output terminal of the register, thus producing a discharging effect. In order to verify such a deduction, a DFFX2 register in a TSMC 0.18 μm standard technology library is used to perform the circuit simulation with an HSPICE software.

Figure 1:
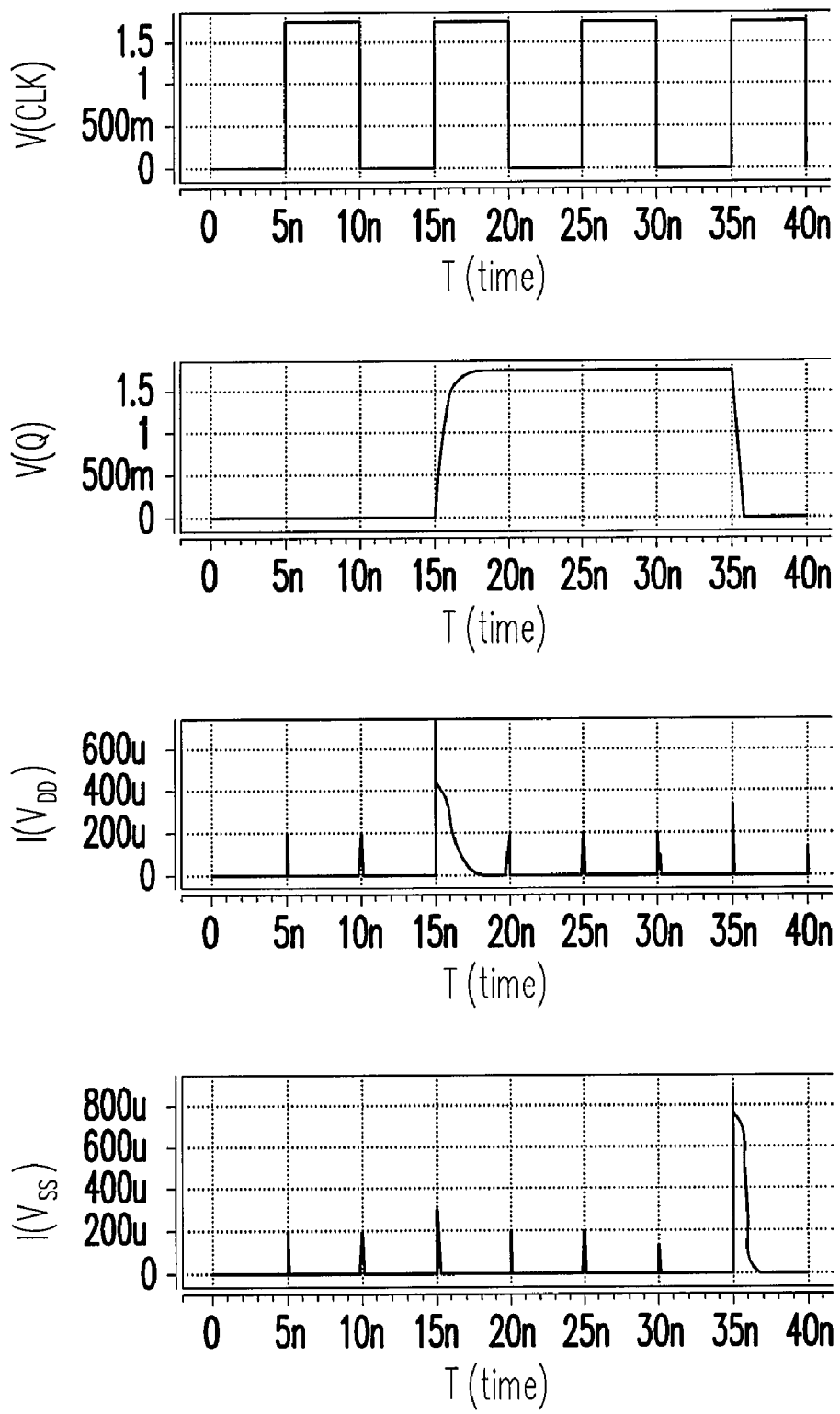
FIG. 1 is a peak current result of a register in a conventional circuit simulation.

Assuming a clock transition time is 0.1 ns, and the output load of the register is 0.3 pf, the simulation result is as shown in FIG. 1. As can be seen from FIG. 1 that, the clock signal V(CLK) takes every 10 ns as a cycle, and at the time of 15 ns, the output signal V(Q) of the register changes from 0 to 1, and at this time, the peak current I ($V_{DD}$) at the power line $V_{DD}$ is 692 uA, the peak current I ($V_{SS}$) at the ground line $V_{SS}$ is 348 uA, thus, the peak current occurs due to the charging effect at the power line $V_{DD}$. When the time is 35 ns, the output signal V(Q) of the register changes from 1 to 0, the peak current I ($V_{DD}$) at the power line $V_{DD}$ is 303 uA, the peak current I ($V_{SS}$) at the ground line $V_{SS}$ is 829 uA, thus, the peak current occurs due to the discharging effect at the ground line $V_{SS}$.

Therefore, it can be deduced that, the peak current of the register is relevant to the switching direction. As for the same group of registers that are switched at the same time, different combinations of switching directions cause registers' peak currents with different magnitudes. The scope of the present invention lies in that, the registers having output signals with different changing directions are classified into two groups according to the analysis result of the changing current for the registers' output signals, and the number of the two groups of registers are effectively adjusted, such that the difference between the currents of the two groups of registers is reduced, thus effectively reducing the peak current of all the registers when the chip is operated. It is further illustrated below through two embodiments.

Figure 2:
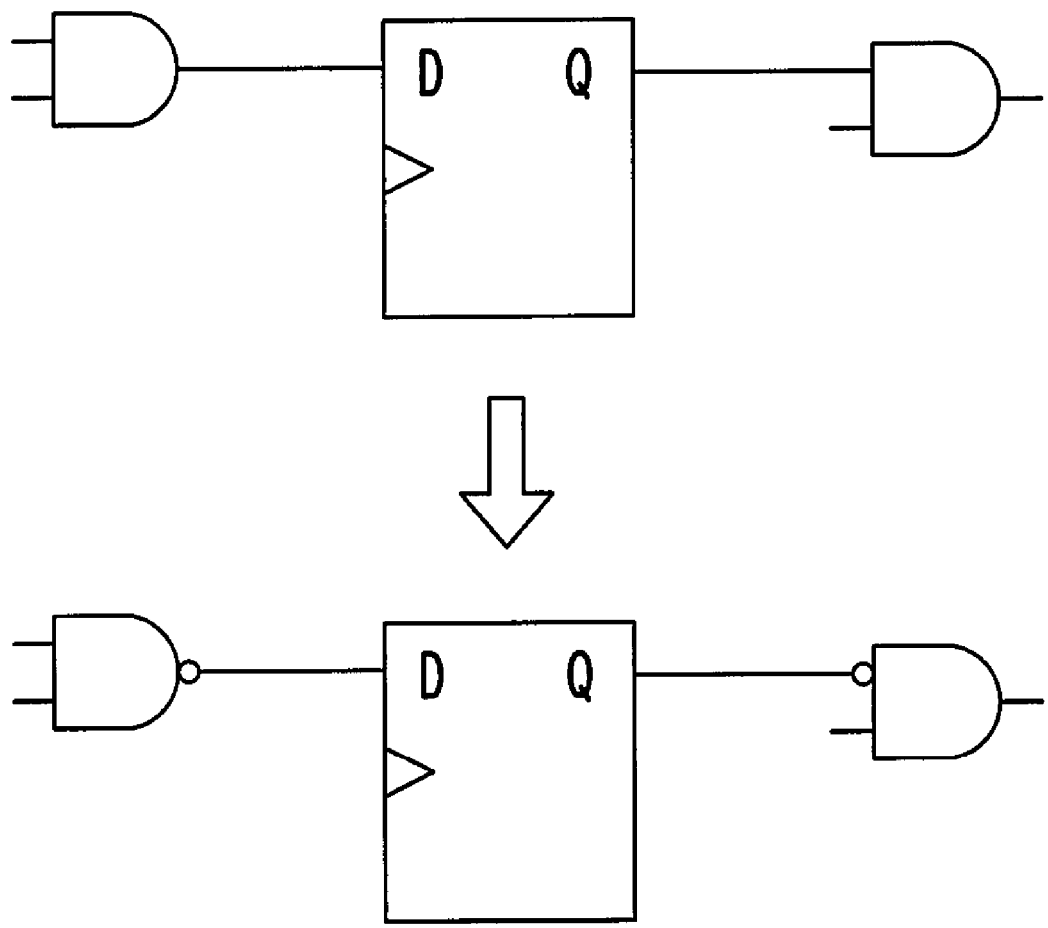
FIG. 2 shows a circuit structure of registers having inverter pairs.

In a first embodiment, the method for reducing the peak current is suitable for reducing the peak current generated by a plurality of registers in a circuit. The circuit in this embodiment is, for example, a gate-level netlist. Referring to FIG. 2, as for the gate-level netlist, a circuit structure with inverter pairs is used to invert the output phase and the input phase of the register. As such, the switching direction of the register is opposite to its original switching direction. Such a circuit structure may be used to change the switching direction of the register in the sequential circuit, such that the sum of charging current of the registers with the switching direction from 0 to 1 is made close to the sum of discharging current of the registers with the switching direction from 1 to 0.

Figure 3:
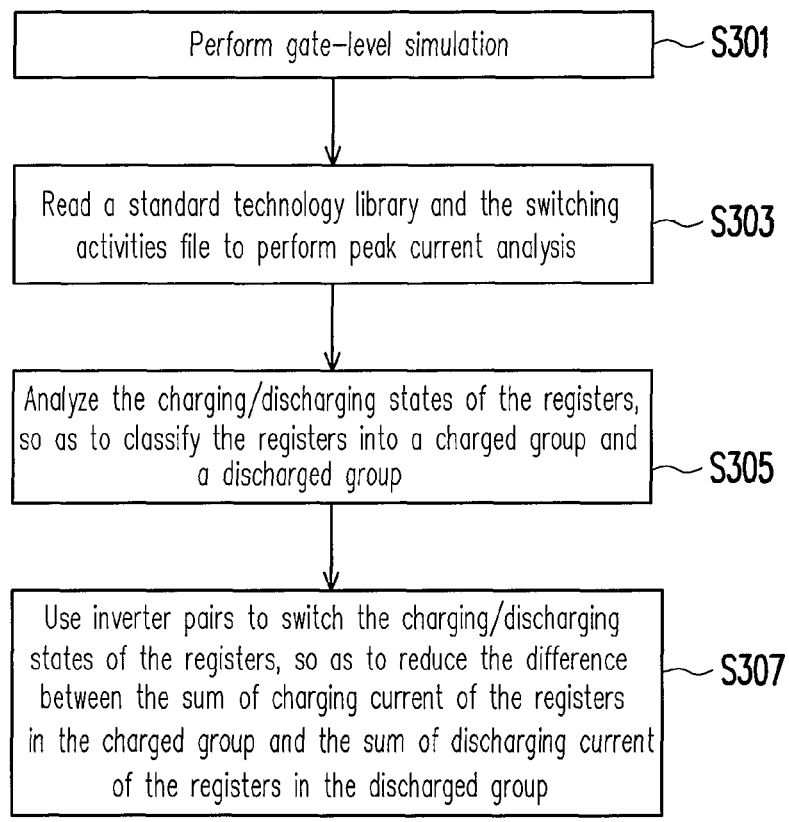
FIG. 3 is a flow chart of a method for reducing the peak current according to a first preferred embodiment of the present invention.

FIG. 3 is a flow chart of a method for reducing the peak current according to a first embodiment of the present invention. First, in Step S301, a gate-level simulation is performed for the given circuit, so as to generate a switching activities file for the switching of charging/discharging states of each register in the circuit. Next, in Step S303, a standard technology library is read for performing a peak current analysis with the switching activities file generated in Step S301. When the peak current occurs, in Step S305, the charging/discharging states of registers in the circuit are analyzed, so as to classify the registers into a charged group and a discharged group. Finally, in Step S307, inverter pairs are added to input/output terminals of a part of the registers, so as to switch the charging/discharging states of the registers, thus reducing the difference between the sum of charging current of the registers in the charged group and the sum of discharging current of the registers in the discharged group. In order to easily demonstrate the concept of reducing the difference between the sum of charging current and the sum of discharging current, an embodiment is particularly illustrated herein below.

Assuming that the magnitudes of the charging current or discharging current generated by each register in the given circuit are all the same when each register is switched among charging/discharging states, the magnitude of the peak current must be in direct proportion to the number of registers with the same charging/discharging state at the same time. With the method for reducing the peak current of the present invention, in an ideal state, if the total number of the original registers is an even number, the number of registers in the charged group and that in the discharged group are the same after the registers are switched between the charging/discharging states, that is, the difference there-between is 0. When the total number of the original registers is an odd number, the difference between the number of registers in the charged group and that in the discharged group is 1 after the registers are switched between the charging/discharging states of the registers.

For example, when the total number of the registers is 10, and the registers are all at the charging state when the peak current occurs, inverter pairs are added to input/output terminals of 5 registers therein, thus, after switching the charging/discharging states of the registers, the number of the registers in the charged group and that in the discharged group are both 5 when the peak current occurs, that is, the difference there between is 0. Moreover, assuming the total number of the registers is 11, and the registers are all at a charged state when the peak current occurs, inverter pairs are added to input/output terminals of 5 (6) registers therein, thus, after switching the charging/discharging states of the registers, the number of the registers in the charged group is 6 (5) and the number of the registers in the discharged group is 5 (6) when the peak current occurs, that is, the difference between the number of the registers in the charged group and that in the discharged group is 1.

Therefore, when the peak current occurs, through the above steps, the numbers of charged registers and that of the discharged registers in the circuit are about equivalent, or even the same, thus, the difference between the sum of charging current of the charged registers and the sum of discharging current of the discharged registers is correspondingly minimized. Therefore, the situation that a plurality of registers are charged or discharged at the same time is avoided, thereby correspondingly reducing the magnitude of the generated peak current.

In this embodiment, the total number of the registers is 10 or 11, however, it is not intended to limit the present invention. It should be appreciated by those of ordinary skill in the art that the method for reducing the peak current of the present invention can be applied to circuits with different numbers of registers to achieve the objective of reducing the peak current as well according to the practical requirements without departing from the scope of the present invention. When the number of the registers is much greater, and the difference between the charging current and the discharging current is much larger, the efficacy of the present invention is more obvious.

Figure 4A:
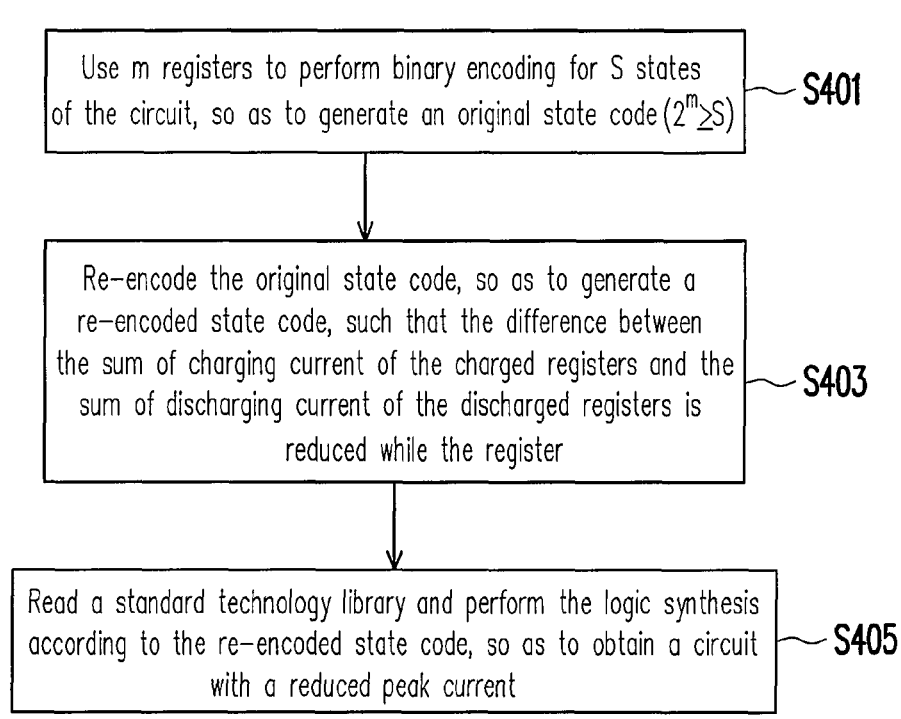
FIG. 4A is a flow chart of the method for reducing the peak current according to a second preferred embodiment of the present invention.

In a second embodiment, the method for reducing the peak current is suitable for reducing the peak current generated by a plurality of registers in a circuit. The circuit is, for example, a finite state machine (FSM) circuit. FIG. 4A is a flow chart of a method for reducing the peak current according to a second embodiment of the present invention.

Referring to FIG. 4A, first, in Step S401, for a circuit having S states, m registers are used to perform binary encoding for the S states, so as to generate an original state code, wherein m is an integer greater than 0, and the relation between the register number m and the state number S is $2^m \geq S$ in order to make the binary encoding of the registers cover all different states.

Next, in Step S403, the original state code obtained in Step S401 is re-encoded, so as to generate a re-encoded state code, such that the difference between the sum of charging current of charged registers and the sum of discharging current of discharged registers is reduced while the registers are switched among the states.

Figure 4B:
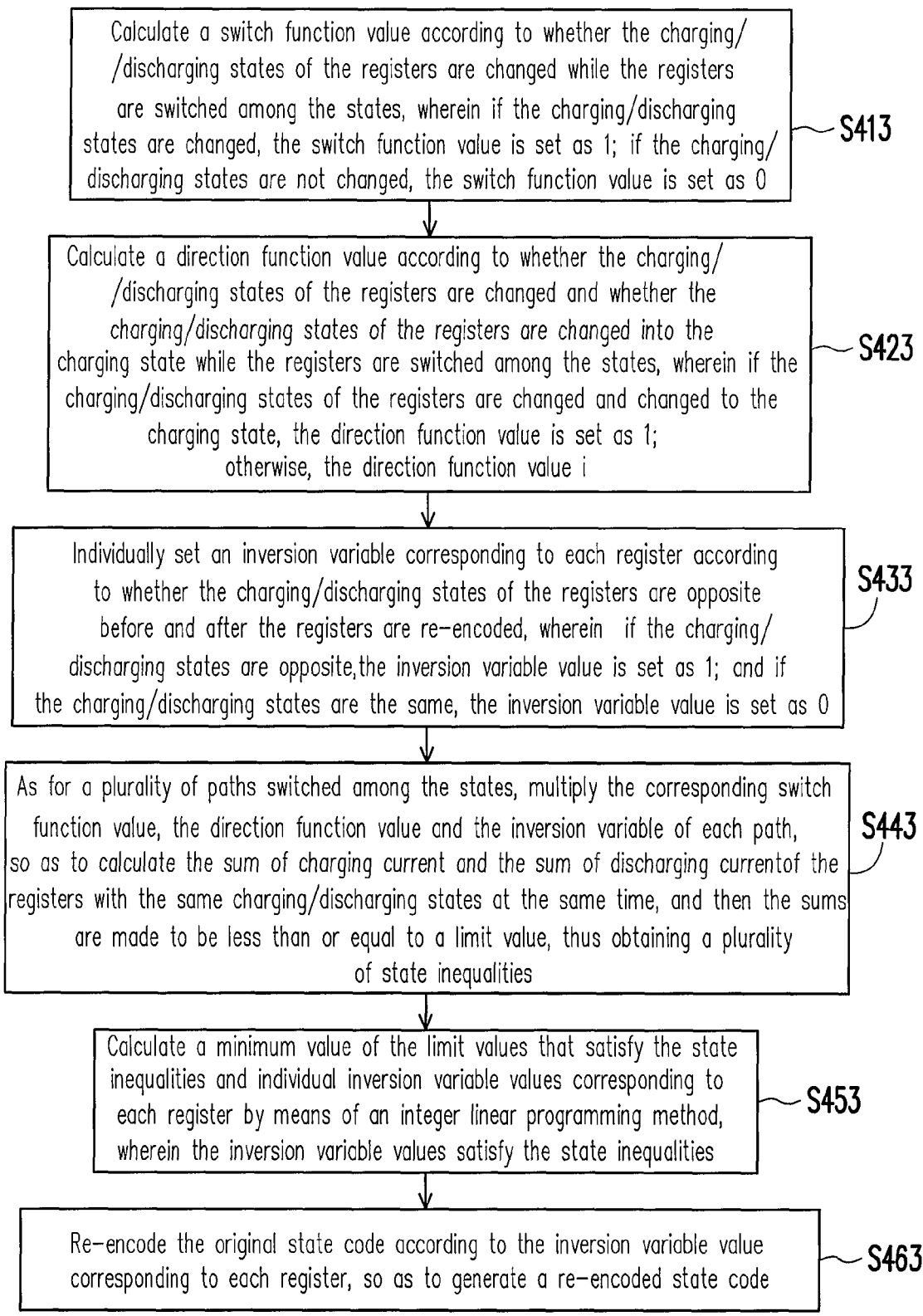
FIG. 4B is a flow chart of the re-encoding method in Step S403 of FIG. 4A.

FIG. 4B is a flow chart of the re-encoding method in Step S403 of FIG. 4A. The re-encoding method includes the following steps. (1) A switching function value is calculated according to whether the charging/discharging states of the registers are changed or not while the registers are switched among the states, wherein if the charging/discharging state is changed, the switching function value is set as 1; if the charging/discharging state is not changed, the switching function value is set as 0 (Step S413). (2) A direction function value is calculated according to whether the charging/discharging states of the registers are changed and whether the charging/discharging states of the registers are changed into the charging state while the registers are switched among the states, wherein if the charging/discharging states of the registers are changed, and changed into the charging state, the direction function value is set as 1; otherwise, the direction function value is set as 0 (Step S423). (3) An inversion variable corresponding to each register is individually set according to whether the charging/discharging states of the registers are opposite before and after the registers are re-encoded, wherein if the charging/discharging states are opposite, the inversion variable value is set as 1; if the charging/discharging states are the same, the inversion variable value is set as 0 (Step S433). (4) As for a plurality of paths when switched among the states, the corresponding switching function value, the direction function value and the inversion variable of each path are multiplied, so as to respectively calculate the sum of charging current and the sum of discharging current of the registers with the same charging/discharging states at the same time, and then the sums are made to be less than or equal to a limit value, thus obtaining a plurality of state inequalities, wherein the limit value is a variable (Step S443). (5) The minimum value of the limit value satisfying the state inequalities and individual inversion variable values corresponding to each register are calculated by means of the integer linear programming method, wherein the inversion variable values satisfy the state inequalities (Step S453). (6) The original state code is re-encoded according to the inversion variable value corresponding to each register, so as to generate a so-called re-encoded state code (Step S463). It should be noted that the switching function value is calculated first, and then the direction function value and inversion variable values are calculated in the above re-encoding flow, however, it is not intended to limit the present invention, and in practical application, the steps may be performed separately without any sequential order.

Referring to FIG. 4A again, after Step S403, Step S405 is performed, a standard technology library is read, and the logic synthesis is performed according to the re-encoded state code obtained in Step S403, thus obtaining a circuit with a reduced peak current.

The detailed process and implementation of the method for reducing the peak current of the present invention are demonstrated below through examples.

Figures 5, 6:
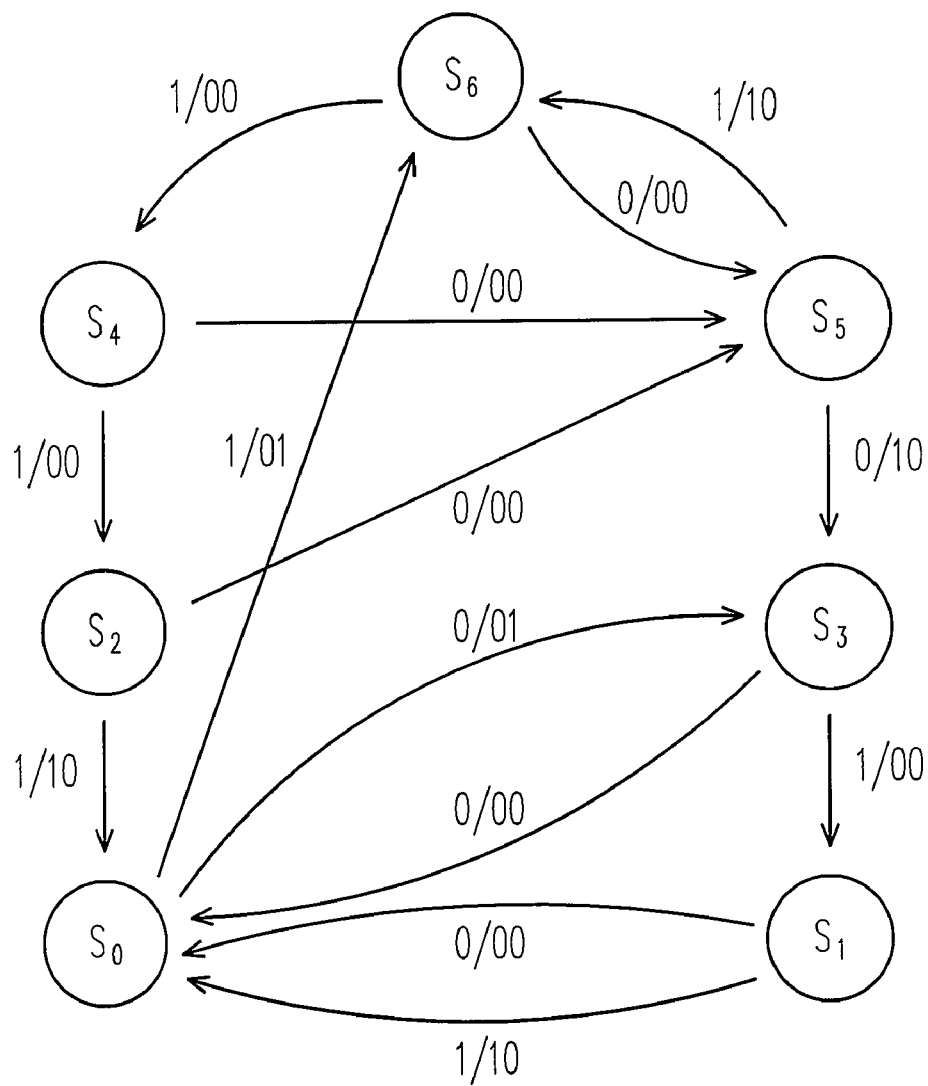
FIG. 5 is a state transition graph of a finite state machine circuit according to a preferred embodiment of the present invention.
FIG. 6 shows an original state code of the finite state machine circuit according to a preferred embodiment of the present invention.

First, assuming a finite state machine circuit includes S states, wherein S is an integer greater than 0. In order to facilitate the illustration, a finite state machine including seven states is taken as an example, and it is assumed that the magnitudes of charging current or discharging current generated by each register are all the same while the registers are switched among the charging/discharging states. Therefore, the magnitude of the peak current is definitely in direct proportion to the number of registers having the same charging/discharging states at the same time. Referring to FIG. 5, it is a state transition graph of the finite state machine circuit according to a preferred embodiment of the present invention. In FIG. 5, $S_0$, $S_1$, $S_2$, $S_3$, $S_4$, $S_5$ and $S_6$ respectively indicates seven states of the finite state machine circuit in this embodiment. In the figure, the state transition path $S_6 \rightarrow S_4$ and the weight 1/00 on the connection line indicate that the circuit input is 1 and the circuit output is 00 when the finite state machine is switched from state $S_6$ to $S_4$. It can be seen from FIG. 5 that, the finite state machine circuit of this embodiment has totally 13 state transition paths. FSM state encoding is performed for encoding seven states in the FIG. 5, and $2^3$ must be taken since the value should be greater than or equal to 7, thus, three registers are used in hardware to perform binary encoding of 3 bits, so as to generate the original state code (as shown in FIG. 6).

After the state code is obtained, the charging/discharging activities of all the registers in the circuit during each data transmission are analyzed (as shown in FIG. 7). Referring to FIG. 7, when the state transition path is switched from $S_0$ to $S_6$, the output phases of the registers ($R_2$, $R_1$, $R_0$) are switched from (0, 0, 0) to (1, 1, 1), such that the outputs of the three register are all at the charging state. Compared with other paths, this transition path mainly causes the registers to generate the largest peak current.

In order to find out the state code for minimizing the peak current of the register, Integer Linear Programming is used. First, assuming the finite state machine has totally S states, thus, m registers may be used to perform the state encoding of the finite state machine, wherein m is an integer greater than 0, and satisfies $2^m \geq S$. The registers are respectively named as $R_0, R_1, \ldots, R_{m-1}$ below.

During the encoding of the finite state machine, as for each state transition path $S_i \rightarrow S_j$, two functions are defined, i.e., switching function $h_{i \rightarrow j}$ and direction function $d_{i \rightarrow j}$. The switching function $h_{i \rightarrow j}$ is used to indicate whether the charging/discharging states of the register $R_k$ are changed while the registers are switched among the states $S_i \rightarrow S_j$. If the charging/discharging states are changed, $h_{i \rightarrow j}(k)=1$, otherwise, $h_{i \rightarrow j}(k)=0$. The direction function $d_{i \rightarrow j}$ is used to indicate whether the charging/discharging states of the register $R_k$ are changed and whether the charging/discharging states of the register $R_k$ are changed into the charging state while the registers are switched among the states $S_i \rightarrow S_j$. If the charging/discharging states of the register $R_k$ are changed, and changed into the charging state, $d_{i \rightarrow j}(k)=1$, otherwise, $d_{i \rightarrow j}(k)=0$.

Moreover, for each register $R_k$, an inversion variable $x_k$ is defined, which indicates whether the charging/discharging states are opposite before and after the register is re-encoded. That means if $x_k=0$, it indicates that the charging/discharging states are the same before and after the register $R_k$ are re-encoded. On the other aspect, if $x_k=1$, it indicates that the charging/discharging states are opposite before and after the register $R_k$ are re-encoded.

As for a plurality of paths switched among the states, the corresponding switching function value, the direction function value and the inversion variable are multiplied, so as to calculate the sum of charging current and the sum of discharging current of the registers with the same charging/discharging states at the same time, and then, the sums are made to be less than or equal to a limit value, thus obtaining a plurality of state inequalities, wherein the limit value is a variable. As the magnitude of the peak current is in direct proportion to the number of registers with the same charging/discharging states at the same time, an integer variable peak is used to represent the limit value herein. In view of the above, as for the integer variable peak, each state transition path $S_i \rightarrow S_j$ has the following two limitations.

(1) If the register $R_k$ of the finite state machine with the original code is switched from 0 to 1, and the inversion variable $x_k$ is 0, the re-encoded register $R_k$ is still switched from 0 to 1. On the other aspect, if the register $R_k$ of the finite state machine with the original code is switched from o 1 to 0, and the inversion variable $x_k$ is 1, the re-encoded register $R_k$ is switched from 0 to 1. Therefore, the number of the registers that are switched from 0 to 1 at the same time will limit the integer variable peak, which may be represented as Formula 1:

$$\sum_{k=0}^{m-1} h_{i \rightarrow j}(k) \times d_{i \rightarrow j}(k) \times (1-x_k) + \sum_{k=0}^{m-1} h_{i \rightarrow j}(k) \times (1-d_{i \rightarrow j}(k)) \times x_k \leq \text{peak}.$$

(2) Similarly, the number of registers that are switched from 1 to 0 at the same time also limits the integer variable peak, which may be represented as Formula 2:

$$\sum_{k=0}^{m-1} h_{i \rightarrow j}(k) \times (1-d_{i \rightarrow j}(k)) \times (1-x_k) + \sum_{k=0}^{m-1} h_{i \rightarrow j}(k) \times d_{i \rightarrow j}(k) \times x_k \leq \text{peak}.$$

From the above example of the finite state machine, using the original state code causes the integer variable peak to be equal to 3 in the state transition path $S_0 \rightarrow S_6$, and a larger peak current is also generated correspondingly. Each state transition path may be represented by the switching function $h_{i \rightarrow j}$ and the direction function $d_{i \rightarrow j}$, thus obtaining an analysis table as shown in FIG. 8.

Referring to FIG. 8, together with Formula 1 and Formula 2, directed to a plurality of paths switched among the states, the corresponding switching function values, the direction function values and the inversion variables are multiplied, and the product is made to be less than or equal to the integer variable peak, thus obtaining the following a plurality of state inequalities.

Under the first circumstance, the integer variable peak represents the limit value of the number of registers in the charging stated at the same time, thus, the obtained state inequalities are shown as follows:

$(1-x_1)+(1-x_0) \leq \text{peak};$ $(1-x_2)+(1-x_1)+(1-x_0) \leq \text{peak};$ $x_1 \leq \text{peak};$ $x_2+x_0 \leq \text{peak};$ $x_0 \leq \text{peak};$ $x_1+x_0 \leq \text{peak};$ $x_0 \leq \text{peak};$ $x_1+(1-x_0) \leq \text{peak};$ $x_1 \leq \text{peak};$ $x_2+(1-x_1)+(1-x_0) \leq \text{peak};$ $(1-x_1)+(1-x_0) \leq \text{peak};$ $x_0 \leq \text{peak};$ $x_1+x_0 \leq \text{peak}.$ Under the second circumstance, the integer variable peak represents the limit value of the number of registers in the discharging stated at the same time, thus, the obtained state inequalities are shown as follows:

$x_1+x_0 \leq \text{peak};$ $x_2+x_1+x_0 \leq \text{peak};$ $(1-x_1) \leq \text{peak};$ $(1-x_2)+(1-x_0) \leq \text{peak};$ $(1-x_0) \leq \text{peak};$ $(1-x_1)+(1-x_0) \leq \text{peak};$ $(1-x_0) \leq \text{peak};$ $(1-x_1)+x_0 \leq \text{peak};$ $(1-x_1) \leq \text{peak};$ $(1-x_2)+x_1+x_o \leq \text{peak};$ $x_1+x_0 \leq \text{peak};$ $(1-x_0) \leq \text{peak};$ $(1-x_1)+(1-x_0) \leq \text{peak}.$ According to the above inequalities, the minimum value of the limit values of the above state inequalities may be calculated by means of the integer linear programming method, thus obtaining the minimum value of the integer variable peak as 2, and the corresponding inversion variable values of the registers as $x_2=0$, $x_1=0$, $x_0=1$, wherein the inversion variable values all satisfy the above state inequalities. According to the obtained inversion variable values, inverter pairs are added in front of the state registers, or the original state code is re-encoded (if the inversion variable value is 1, the values of corresponding bits in the original state code are changed; and if the inversion variable value is 0, the values of corresponding bits in the original state code are not changed), so as to generate a re-encoded state code. In this embodiment, the inversion variable values corresponding to each register are $x_2=0$, $x_1=0$, $x_0=1$, thus, the values of the corresponding bits of the registers $R_2$ and $R_1$ remain unchanged, and the values of the corresponding bits of the register $R_0$ are opposite to the original ones, therefore, a set of new state codes is obtained (as shown in FIG. 9).

After the new state codes are obtained, the charging/discharging activities of all the registers in the circuit during each data transmission are analyzed once again (as shown in FIG. 10). Referring to FIG. 10, as for each state transition path $S_i \rightarrow S_j$, the number of registers in charging state or discharging state at the same time is reduced from 3 to 2. Therefore, compared with the original state code, the peak current generated by the register has reduced by about 33.3%.

The above embodiment takes the encoding of 3 registers as an example, however, it is not intended to limit the present invention. It should be appreciated by those of ordinary skill in the art that, the state re-encoding method of the present invention can be applied to encode more than 3 registers to achieve the same objective of reducing the peak current, according to the practical requirements without departing from the scope of the present invention, and the larger the number of the registers is, the more obvious the efficacy of the present invention is.

To sum up, when the peak current occurs, the present invention analyzes the charging/discharging states of all the registers, and compensates the peak current consumption caused by the charging/discharging of the registers through a circuit structure with inverter pairs, thus finally obtaining a new gate-level netlist with a low peak current. According to another aspect of the present invention, as for a finite state machine circuit, the state code with the lowest peak current is obtained by means of the state re-encoding, and after the standard technology library is read, the logic circuit synthesis is performed for the re-encoded state code, thus a circuit with a low peak current is obtained. Therefore, the present invention indeed achieves the effect of reducing the peak current, and it can be applied together with the electronic design automation (EDA) tools commonly used in the current industry.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for controlling a peak current of a circuit having a plurality of registers, the method comprising:
   a. analyzing charging/discharging states of a plurality of registers in the circuit, by using an electronic design automation tool, and classifying the registers into a charged group and a discharged group based on results of the analyzing; and
   b. connecting an inverter pair to input/output terminals of each register in a portion of the registers to switch the charging/discharging states of said portion of the registers thereby reducing a difference between a sum of charging currents of the registers in the charged group and a sum of discharging currents of the registers in the discharged group.

2. The method for controlling a peak current of a circuit as claimed in claim 1, wherein the circuit comprises a gate-level netlist.

3. The method for controlling a peak current of a circuit as claimed in claim 2, wherein before Step a., further comprises:

performing a gate-level simulation for the circuit, so as to generate a switching activities file for the charging/discharging states of the registers;

reading a standard technology library and the switching activities file, so as to perform a peak current analysis; and performing Step a. when the peak current is generated.

4. The method for controlling a peak current of a circuit as claimed in claim 3, wherein Step b. further comprises switching the charging/discharging states of the registers, so as to minimize a difference between the sum of charging currents of the registers in the charged group and the sum of discharging currents of the registers in the discharged group.

5. The method for controlling a peak current of a circuit as claimed in claim 1, wherein the circuit is a finite state machine circuit.

6. A method for controlling a peak current of a circuit having a plurality of registers, suitable for reducing a peak current of a circuit that comprises s states, wherein s is a positive integer, the method comprising:

a. using m registers to do binary encoding of m bits for the s states of the circuit, by using an electronic design automation tool, so as to generate an original state code, wherein m is a positive integer, and $2^m \geq s$; and b. re-encoding the original state code to generate a re-encoded state code for indicating states in which charged/discharged registers are switch to thereby reducing a difference between a sum of charging currents of charged registers in the circuit and a sum of discharging currents of discharged registers in the reduce, while the charged/discharged registers are switched among the s states.

7. The method for controlling a peak current of a circuit as claimed in claim 6, wherein Step b. comprises:

b1. calculating a switching function value according to whether charging/discharging states of the charged/discharged registers are changed while the charged/discharged registers are switched among the s states;

b2. calculating a direction function value according to whether charging/discharging states of the charged/discharged registers are changed and whether the charging/discharging states of the charged/discharged registers are changed into a charging state while the registers are switched among the s states;

b3. individually setting an inversion variable according to whether the charging/discharging states of the charged/discharged registers are opposite before and after the charged/discharged registers are re-encoded;

b4. directing to a plurality of paths switched among the s states, multiplying the corresponding switching function value, the direction function value and the inversion variable, so as to respectively calculate the sum of charging currents of the charged registers and the sum of discharging currents of the discharged registers with the same charging/discharging state at the same time, and letting the calculated two sums respectively to be less than or equal to a limit value, and thereby obtaining a plurality of state inequalities;

b5. calculating a minimum value of the limit value for the state inequalities and an inversion variable value corresponding to each of the charged/discharged registers by means of an integer linear programming method, wherein the inversion variables corresponding to all the charged/discharged registers satisfy the state inequalities; and b6. re-encoding the original state code according to the inversion variable value to generate a re-encoded state code.

8. The method for controlling a peak current of a circuit as claimed in claim 7, wherein Steps b1, b2, and b3 have no sequential order, and they can be rearranged arbitrarily.

9. The method for controlling a peak current of a circuit as claimed in claim 7, wherein Step b1. comprises:

determining whether charging/discharging states of the charged/discharged registers are changed;

setting the switching function value as 1 if the charging/discharging states of the charged/discharged registers are changed; and setting the switching function value as 0 if the charging/discharging states of the charged/discharged registers are not changed.

10. The method for controlling a peak current of a circuit as claimed in claim 7, wherein Step b2. comprises:

determining whether charging/discharging states of the charged/discharged registers are changed and whether the charging/discharging states of the charged/discharged registers are changed into the charging state;

setting the direction function value as 1 if the charging/discharging states are changed and the charging/discharging states of the charged/discharged registers are changed into the charging state; and otherwise, setting the direction function value as 0.

11. The method for controlling a peak current of a circuit as claimed in claim 7, wherein Step b3. comprises:

determining whether charging/discharging states of the charged/discharged registers are opposite before and after the charged/discharged registers are re-encoded;

setting the inversion variable value as 1 if the charging/discharging states are opposite; and setting the inversion variable value as 0 if the charging/discharging states are the same.

12. The method for controlling a peak current of a circuit as claimed in claim 7, wherein Step b6. comprises:

determining an inversion variable value is 1 or 0;

changing values of the corresponding bits in the original state code if the inversion variable value is 1; and unchanging the values of the corresponding bits in the original state code if the inversion variable value is 0.

13. The method for controlling a peak current of a circuit as claimed in claim 6, wherein Step b. further comprises re-encoding the original state, code to generate a re-encoded state code, thereby minimizing the difference between the sum of charging currents of the charged registers and the sum of discharging currents of the discharged registers while the registers are switched among the states.

14. The method for controlling a peak current of a circuit as claimed in claim 6, wherein the circuit is a finite state machine circuit.

15. The method for controlling a peak current of a circuit as claimed in claim 6, further comprising reading a standard technology library, and performing a logic circuit synthesis for the re-encoded state codes.

* * * * *